United States Patent
Sherman

(10) Patent No.: US 6,282,179 B1
(45) Date of Patent: Aug. 28, 2001

(54) METHOD AND SYSTEM FOR REDUCING MULTIPATH FADING IN BENT-PIPE SATELLITE COMMUNICATIONS SYSTEMS

(75) Inventor: Matthew J. Sherman, North Arlington, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 08/953,020

(22) Filed: Oct. 17, 1997

(51) Int. Cl.[7] .................................................. H04B 7/216
(52) U.S. Cl. ..................... 370/320; 370/342; 375/211; 342/353; 342/354; 455/13.1
(58) Field of Search ................................. 370/203, 206, 370/316, 320, 281, 319, 323, 315, 335, 342; 342/352, 353, 354; 455/12.1, 13.1, 13.3; 375/211

(56) References Cited

U.S. PATENT DOCUMENTS

| | | | |
|---|---|---|---|
| 4,259,741 | * 3/1981 | Kawai | 370/323 |
| 5,394,560 | * 2/1995 | Kane | 455/12.1 |
| 5,473,601 | * 12/1995 | Rosen et al. | 370/319 |
| 5,555,257 | * 9/1996 | Dent | 370/319 |
| 5,825,325 | * 10/1998 | O'Donovan et al. | 342/353 |
| 5,848,060 | * 12/1998 | Dent | 370/281 |

* cited by examiner

*Primary Examiner*—Alpus H. Hsu
*Assistant Examiner*—Afsar M. Qureshi

(57) ABSTRACT

A method and system of forming communication links in a satellite communications system. The satellite communications system includes a plurality of transmitter groups, a satellite and a plurality of downlink receivers. Each transmitter is associated with only one transmitter group. At least two transmitters of two separate transmitter groups are disposed geographically adjacent to each other. Each transmitter of a transmitter group transmits an uplink communications signal that is a CDMA signal having a predetermined code that is selected from a code set assigned to the group of transmitters with which the transmitter is associated. Each respective code set is different from other code sets associated with selected groups of transmitters and forms a code set pattern that repeats. The satellite receives the uplink communications signals transmitted by the transmitters and transmits each of the received uplink communications signals as a downlink communications signal directed to a different receiver of the plurality of downlink receivers, such that each downlink communications signal includes no more than one downlink communications signal having a predetermined code such that no substantial multipath conditions exist.

15 Claims, 7 Drawing Sheets

METHOD AND SYSTEM FOR REDUCING MULTIPATH FADING IN BENT-PIPE SATELLITE COMMUNICATIONS SYSTEMS

CROSS-REFERENCE TO RELATED APPLICATIONS

The present application is related to an application entitled "Method and System For Reducing Interbeam Interference And Multipath Fading In Bent-pipe Satellite Communications Systems" by Matthew J. Sherman, application Ser. No. 08/953,600, filed concurrently with the present application, and incorporated by reference herein.

BACKGROUND OF THE INVENTION

1. Field of the Invention

The present invention relates to the field of telecommunications. More particularly, the present invention relates to a method and a system for eliminating multipath fading caused by multiple uplink beams coupling in a bent-pipe satellite communications system.

2. Description of the Related Art

In a bent-pipe satellite communications system that combines four spatially adjacent uplink beams, with each beam using spread-spectrum techniques for beam separation, multipath fading can occur if two or more of the adjacent uplink beams are routed on a satellite to the same destination earth station receiver, such as an earth station for a terrestrial gateway communications system. While the spread-spectrum code set used with a particular uplink beam would be different from the code set used on adjacent uplink beams, an uplink signal transmitted from the edge of one beam couples equally well to an adjacent beam. If the two adjacent beams carrying the uplink signal are routed to the same gateway receiver, a multipath condition can exist because the same signal has been effectively transmitted on the two adjacent beams and combined prior to being received at the gateway receiver. That is, since RF phasing of the transponders of the two adjacent uplink beams can vary, destructive interference may occur between the two RF paths, resulting in a substantial loss of signal power at the gateway receiver. In effect, the gateway receiver receives the same signal from two different sources by the intercoupling of uplink signals between adjacent uplink beams.

FIG. 1 shows an exemplary multi-beam bent-pipe satellite communications system 10 that illustrates multipath fading caused by an uplink beam signal being coupled into two adjacent uplink beams. Satellite communications system 10 uses four spread-spectrum code sets based, for example, on synchronous Walsh codes, in a well-known manner for separating uplink beams 12, 13, 17 and 18, which each accept transmitted signals using uplink frequency F1. The exemplary code sets are referred to herein as W1–W4. A ground station 11 transmits an uplink communications signal using uplink beam 12. While only ground station 11 is shown within the geographic region covered by beam 12, there are a plurality of ground stations within the geographic region covered by beam 12, but are not shown. Ground station 11 is geographically located near the edge of beam 12 such that the transmitted signal is also coupled into adjacent uplink beam 13. Beams 12 and 13 are received by satellite 14 combined (with themselves and beams 17 and 18) and transmitted over a downlink beam 15 to a common earth station receiver 16, such as a terrestrial gateway. System 10 includes a plurality of gateway receiver stations, of which only gateway receiver 16 is shown. Multipath fading occurs at gateway receiver 16 since multiple versions of the signal from ground station 11 are received (effectively) from two different paths and are potentially destructively combined prior to being received by gateway receiver 16.

FIGS. 2 and 3 respectively show conventional uplink beam tiling patterns for a reuse of four which can be used in satellite communications systems. Each hexagon shown in FIGS. 2 and 3 represents a different geographic region covered by a corresponding uplink beam. The numbers within the hexagons represent a partitioning of resources (such as frequencies, polarizations or code sets) between groups of geographic regions. All the users in geographic regions labeled 1 use the same resources, which are different from the resources used in regions 2, 3 and 4. A similar statement can be made for regions 2, 3, and 4. The patterns shown in FIG. 2 and 3 are representative, and other tiling patterns for sharing resources between groups of 3, 7, 8, etc., regions also exist.

Also shown in an outlined area of the Figures is a grouping of hexagons referred to herein as a "Beam Group" (BG). Each member of the group is assigned a different set of resources. By replicating the beam group multiple times, the full tiling pattern can be generated. It is assumed for the tiling patterns of FIGS. 2–7, that for a prior art design, each beam group is serviced by a different gateway receiver.

FIG. 4 shows the tiling pattern of FIG. 2 applied to a conventional Frequency Division Multiple Access (FDMA) based system utilizing four different uplink frequency groups F1, F2, F3 and F4. Again, the outlined section indicates one beam group. FIG. 5 shows the tiling pattern of FIG. 2 applied to an FDMA-based system utilizing different combinations of uplink frequency groups F1 and F2 and two polarizations P1 and P2. FIG. 6 shows a conventional uplink beam frequency tiling pattern for a Code Division Multiple Access (CDMA) based system. Isolation between users in different beams for such a system is provided by proper allocation of code sets between the beams. FIG. 7 shows the tiling pattern of FIG. 2 applied to codes for a representative CDMA-based system utilizing code sets W1–W4 for isolation between the beams.

Each of the tiling patterns of FIGS. 2–7 suffer from multipath fading that occurs when two adjacent uplink beams are downlink-routed to the same terrestrial gateway receiver. In an FDMA system, this multipath condition is easily remedied through the application of appropriate filtering onboard the satellite. However, for CDMA systems where adjacent beams use the same frequency and polarization, the filtering techniques that are applied in an FDMA system cannot be used. Consequently, what is needed is a method and a system that eliminates the multipath fading effect caused by an uplink transmission being coupled into two adjacent uplink beams utilizing the same frequency and polarization, and downlink routed to the same terrestrial gateway receiver.

SUMMARY OF THE INVENTION

The present invention eliminates the multipath fading effect caused by an uplink transmission being coupled into two adjacent uplink beams and downlink routed to the same terrestrial gateway receiver. The advantages of the present invention are provided by a method and system of forming communication links in a satellite communications system. The satellite communications system includes a plurality of Transmitter Groups (TGs), a satellite and a plurality of downlink receivers. Each transmitter is associated with only one Transmitter Group. A Transmitter Group is defined herein according to a satellite uplink communications beam assignment. All member of a particular TG are assigned the same beam. Each TG is assigned a different beam and corresponding uplink resources. Each transmitter of a transmitter group transmits an uplink communications signal that is a CDMA signal having a predetermined code that is selected from a code set that is assigned to the TG with which the transmitter is associated. Each respective code set is different from other code sets associated with selected groups of transmitters and forms a code set pattern that is repeated within each BG. The satellite receives the uplink communications signals transmitted by the transmitters and transmits each of the received uplink communications signals as a downlink communications signal directed to a different receiver of the plurality of downlink receivers, such that each downlink communications signal includes no more than one downlink communications signal having a predetermined code.

BRIEF DESCRIPTION OF THE DRAWING

The present invention is illustrated by way of example and not limitation in the accompanying figures in which like reference numerals indicate similar elements and in which.

DETAILED DESCRIPTION

The present invention eliminates multipath fading occurring in bent-pipe satellite communications systems when an uplink signal is coupled into two spatially adjacent uplink beams which, in turn, are then downlink routed to the same destination receiver. To eliminate the multipath effects caused by adjacent beam coupling, the present invention provides a method and a system that ensures that only downlink communications signals not originating in adjacent beams and having distinct beam codes are routed to the same destination receiver. That is, the communications signals carried by adjacent uplink beams that are received at a satellite are not routed to the same destination receiver. By ensuring that adjacent uplink beams which utilize the same frequency/polarization combination and are received at the satellite are not routed to the same destination receiver, the potential for multipath is reduced, and the efficiency and performance of a satellite communications system are improved.

Figure 1:
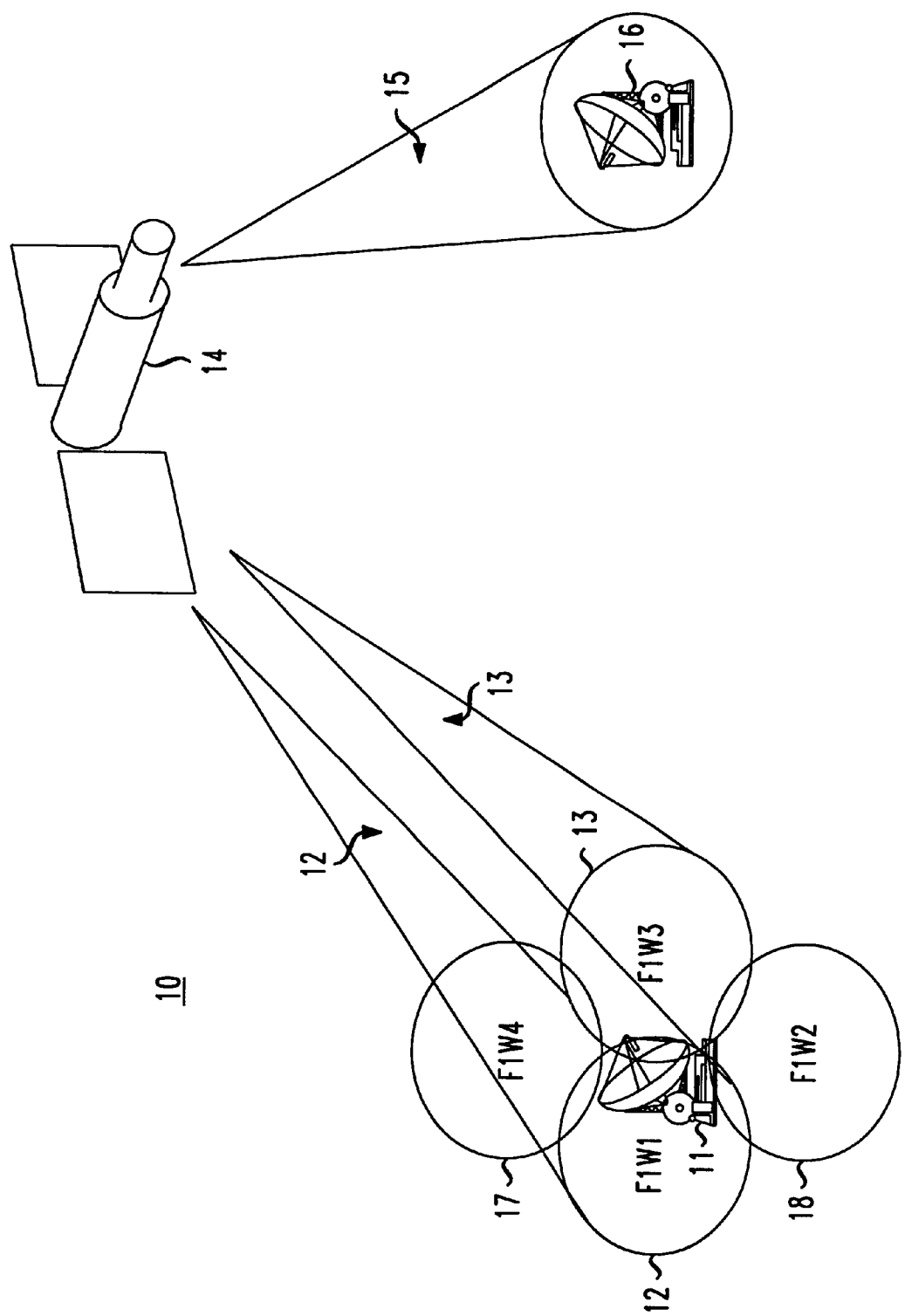
FIG. 1 shows an exemplary bent-pipe satellite communications system in which the present invention eliminates multipath fading that occurs if two adjacent uplink beams are downlink routed to the same terrestrial gateway receiver.
Figure 8:
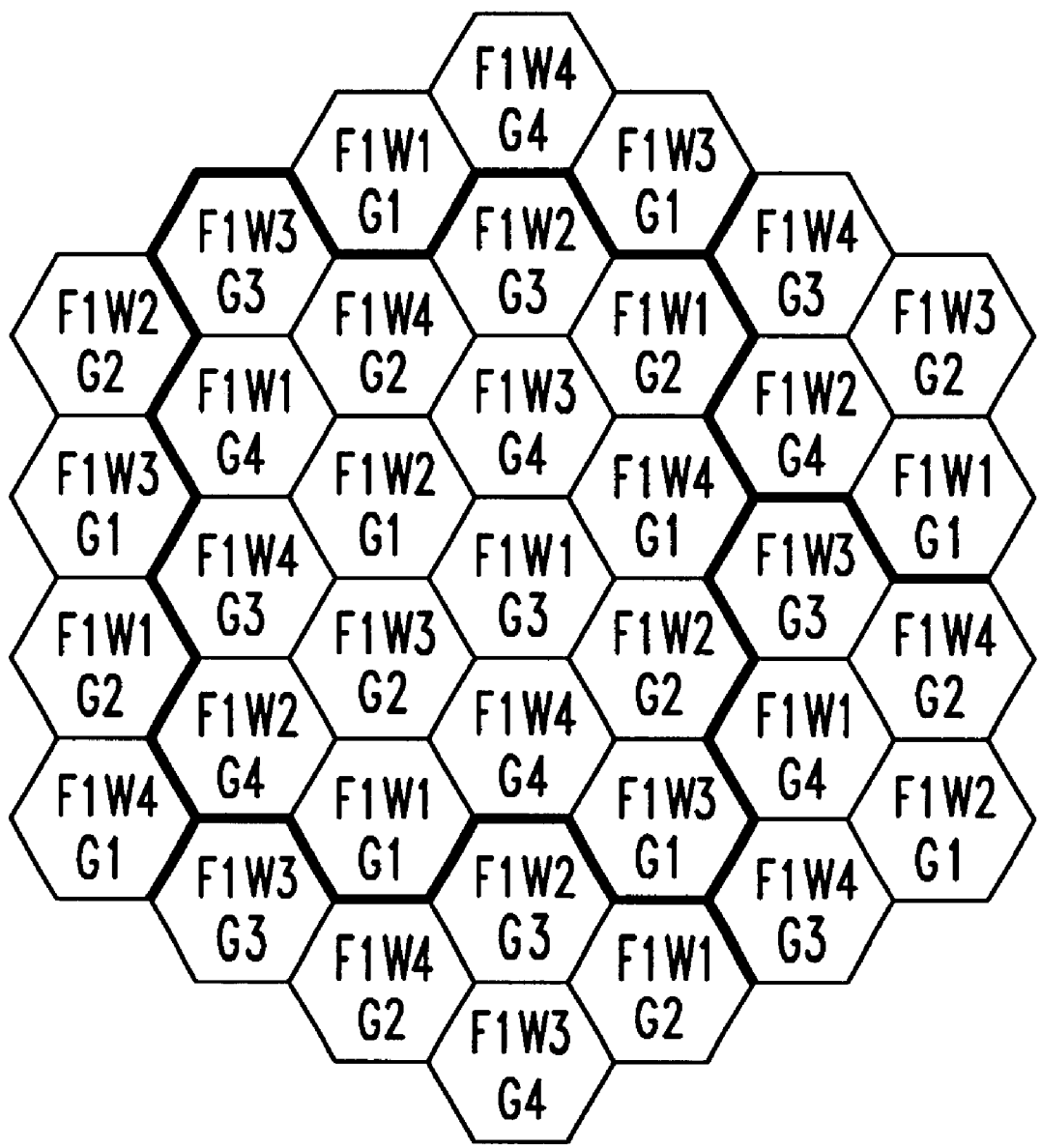
FIG. 8 shows an illustrative embodiment of an uplink/gateway tiling pattern for a CDMA-based system according to the present invention.

FIG. 8 shows an illustrative embodiment of an uplink/gateway beam tiling pattern for a CDMA-based system according to the present invention. In FIG. 8, four different code sets W1–W4 are utilized for separating adjacent uplilk beams, such as beams 12 and 13, in a well-known manner. At satellite 14, the respective communications signals of the adjacent uplink beams 12 and 13 are downlink-routed by satellite 14 so that only one of the two uplink communications signals carried by uplink beams 12 and 13 is received by the intended destination receiver G1–G4 (FIG. 8), such as terrestrial gateway receiver 16 (FIG. 1).

Here, an outlined set of cells indicates a "Gateway Group" (GG). For the illustrative embodiment of FIG. 8, the gateway group associates four gateways with the 16 cells, or beams, in such a way as to guarantee that no adjacent beams in the GG are routed to the same gateway, and no beams using the same code set in the GG are routed to the same gateway. By repeating the GG tiling pattern (as with the BG tiling pattern) any size pattern or number of beams can be supported.

Figure 2:
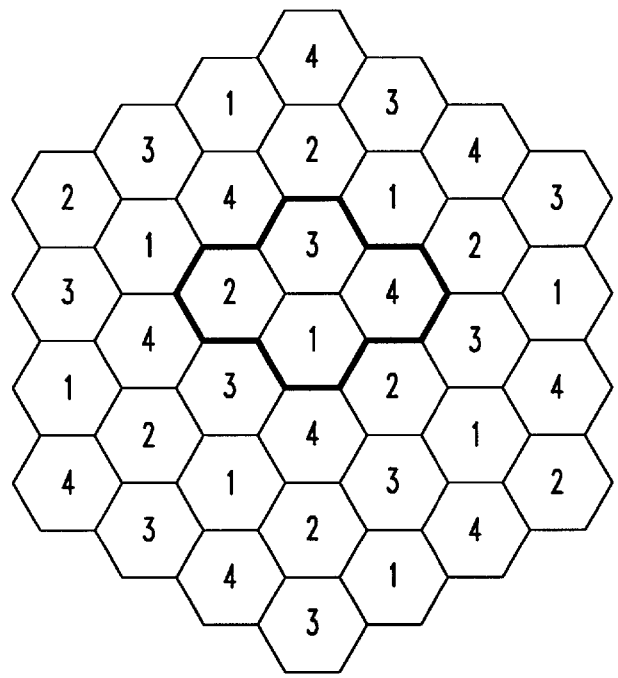
FIG. 2 show a conventional uplink beam tiling pattern used by terrestrial and satellite communications systems.
Figure 3:
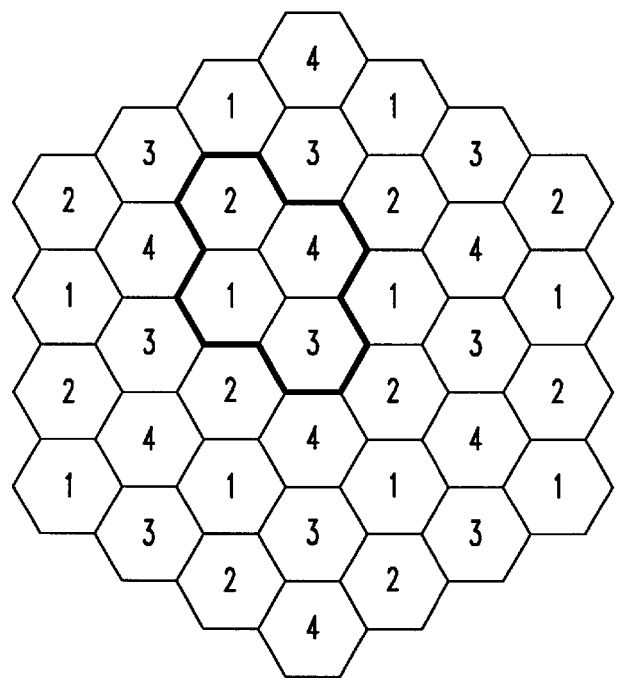
FIG. 3 shows another conventional uplink beam tiling pattern used by terrestrial and satellite communications systems.
Figure 4:
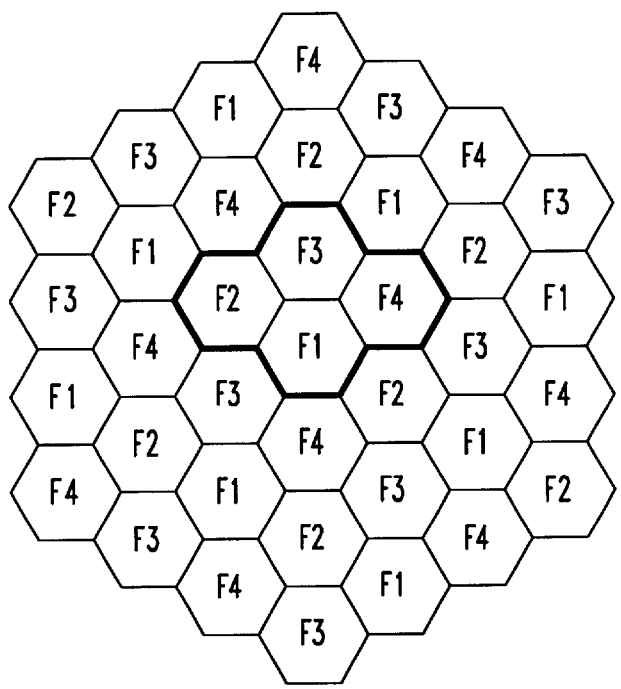
FIG. 4 shows a conventional uplink beam tiling pattern for a Frequency Division Multiple Access (FDMA) based system utilizing four different uplink frequency groups F1–F4.
Figure 5:
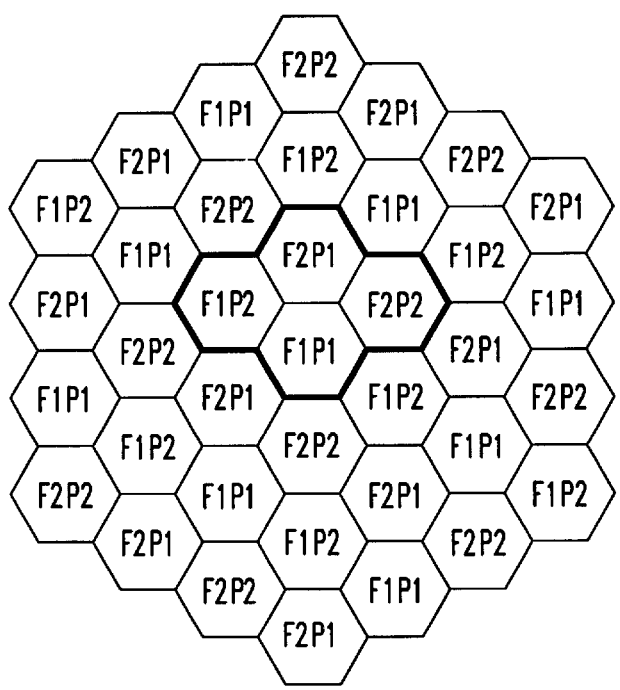
FIG. 5 shows a conventional uplink beam tiling pattern for an FDMA-based system utilizing different combinations of uplink frequency groups F1 and F2 and two polarizations P1 and P2.
Figure 6:
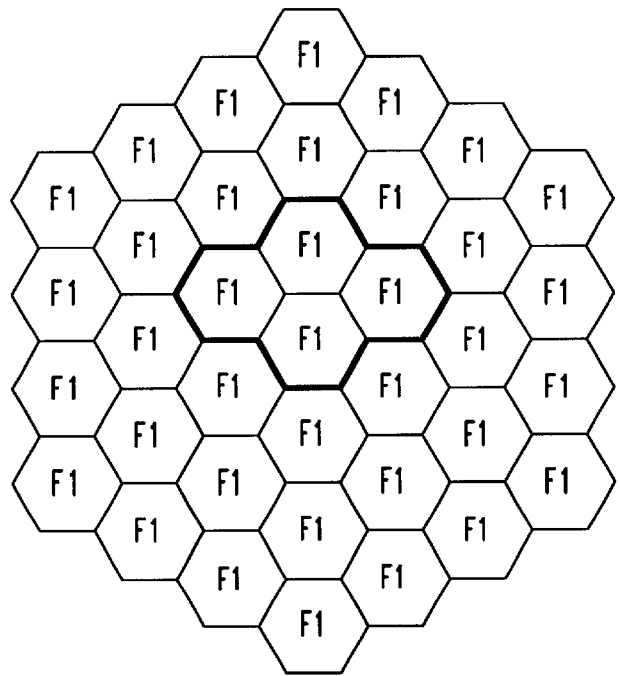
FIG. 6 shows a conventional uplink beam frequency tiling pattern for a Code Division Multiple Access (CDMA) based system.
Figure 7:
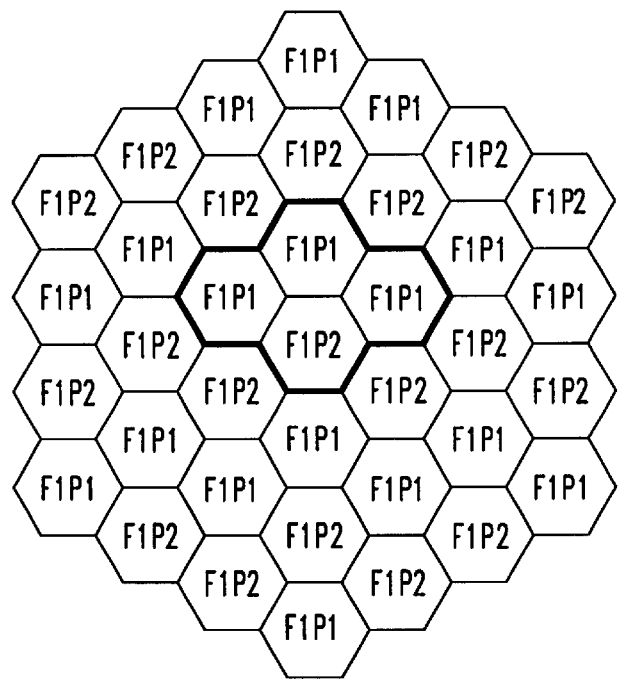
FIG. 7 shows an uplink code set filing pattern for a CDMA-based system utilizing code sets W1–W4.

According to the invention, the uplink beams downlinked to the gateway receivers are grouped in such a way to form a gateway reuse pattern that is different from the code set reuse pattern used for the uplink beams. In this example, the reuse pattern shown in FIG. 3 is applied to develop the gateway reuse pattern, while the reuse pattern shown in FIG. 2 is used to develop the code set reuse pattern. The combined patterns form the larger pattern that is the basis for the GG. That is, an uplink communications signal corresponding to only one of the four different code sets (uplink beams) is transmitted to a given destination receiver and no possible secondary path of transmission to the destination receiver exists, thus ensuring that proper processing of all received signals is possible at the destination receiver. Because no two adjacent beams are routed to each terrestrial gateway receiver, no first tier multipath effects will be experienced at a gateway receiver.

While this invention eliminates all first tier multipath, it does not eliminate same code interference that could occur from secondary coupling of other beams. However, this coupling can be mitigated by other techniques and may be acceptable in some systems. A separate invention utilizing more complex apparatus could be used for eliminating both multipath and same code interference. The present invention is related to an application entitled "Method and System For Reducing Multipath Fading In Bent-pipe Satellite Communications Systems" by Matthew J. Sherman, Ser. No. 08/953,600, and incorporated by reference herein.

Figure 9:
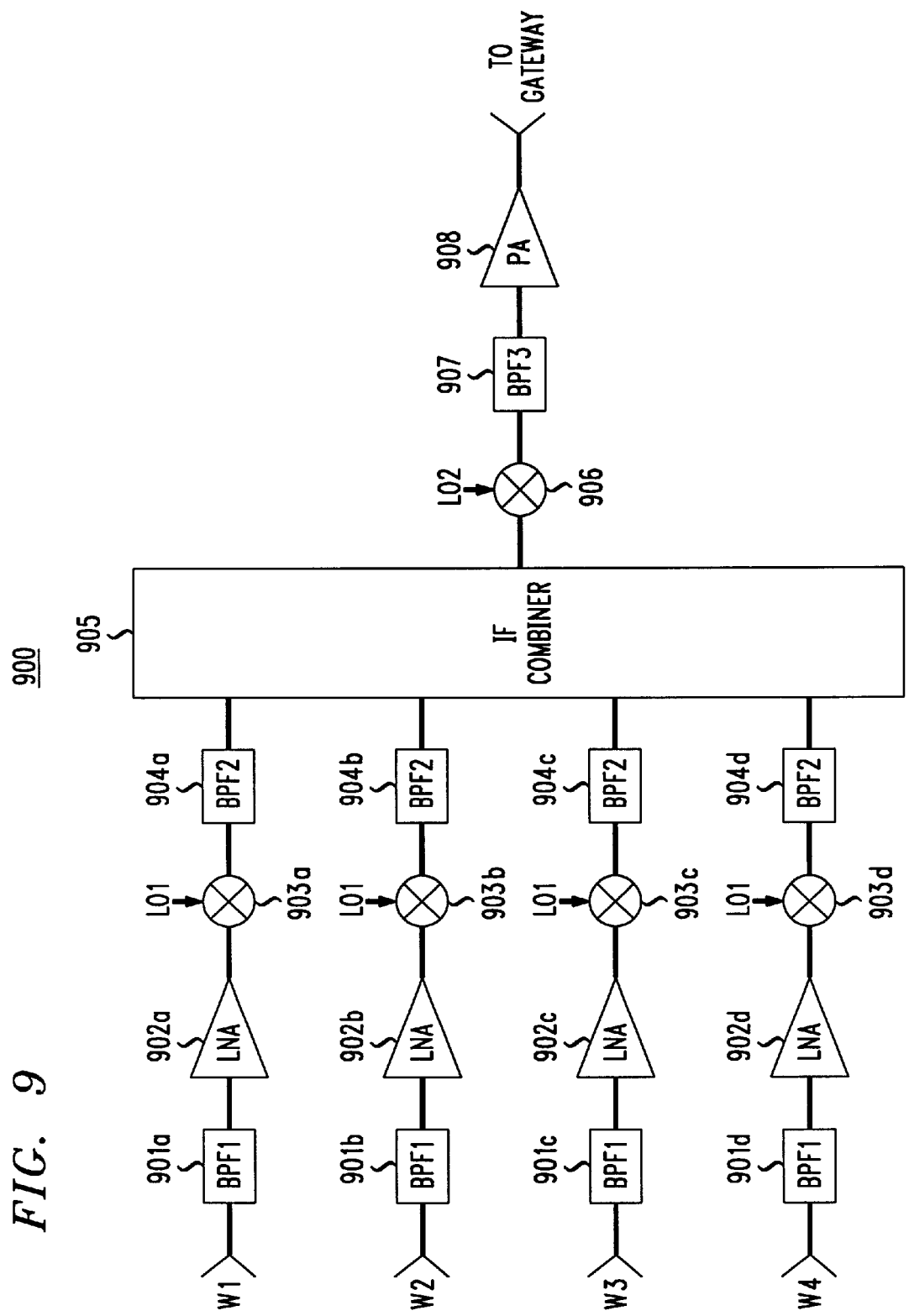
FIG. 9 shows a schematic block diagram of a portion of a satellite that is part of a satellite communications system according to the present invention.

FIG. 9 shows a schematic block diagram of a portion of a satellite 900 that is part of a satellite communications system that uses four uplink beam code sets. All received uplink beam signals from the same code set (W1–W4) are respectively grouped together in a well-known manner. Each group of uplink beam carrier signals respectively pass through a first bandpass filter 901a–901d and then are respectively amplified by a low-noise amplifier LNA 902a–902d. After low-noise amplification, each respective uplink beam signal is down-converted at mixers 903a–903d into four separate IF signals using a first local oscillator LO1. The four IF signals then respectively pass through a second bandpass filter 904a–904d before being input to an IF combiner 905 to form a single IF signal. IF combiner 905 is a standard 4:1 IF combiner. The IF signal output from IF combiner 905 is up-converted at mixer 906 to a selected RF frequency using a second local oscillator LO2. The RF signal then passes through a third bandpass filter 907 before being amplified by a power amplifier PA 908 for downlink transmission to a terrestrial gateway.

Figure 10:
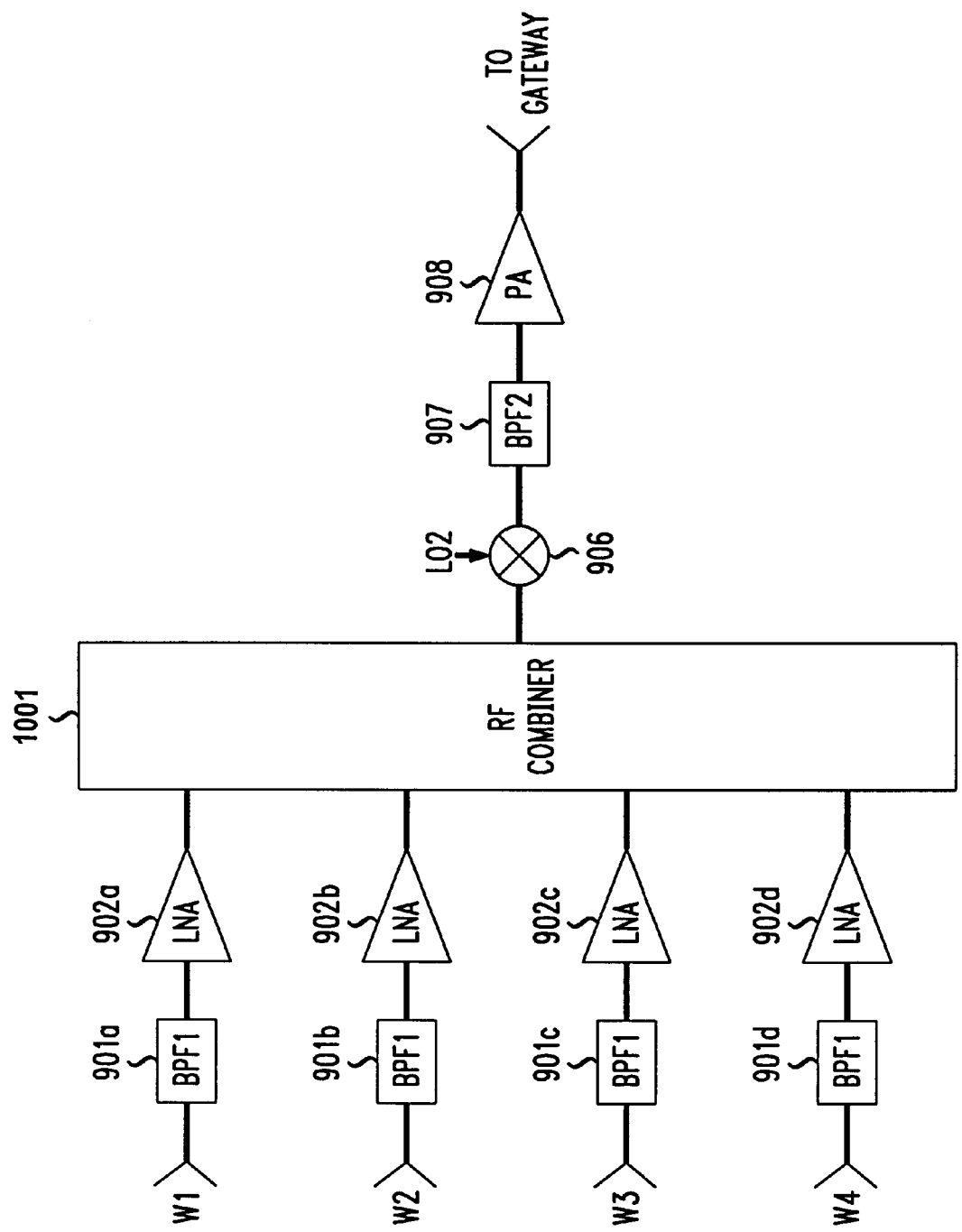
FIG. 10 shows a schematic block diagram of an alternative configuration for the portion of the satellite circuit of FIG. 9 according to the present invention.

FIG. 10 shows a schematic block diagram of an alternative configuration for the circuit of FIG. 9. The circuit of FIG. 10 also uses four uplink beam codes. All received uplink beam signals having a common orthogonal code W1–W4 are respectively grouped together in a well-known manner. Each group of uplink beam carrier signals respectively pass through a first bandpass filter 901a–901d and then are respectively amplified by a low-noise amplifier LNA 902a–902d. After low-noise amplification, each respective uplink beam signal is input to an RF combiner 1001 to form a single RF signal. RF combiner 1001 is a standard 4:1 RF combiner. The RF signal output from RF combiner 1001 is frequency shifted by mixer 906 to a selected RF frequency using a second local oscillator LO2. The single RF signal then passes through a bandpass filter 907 before being amplified by a power amplifier PA 908 for downlink transmission to a terrestrial gateway.

To facilitate radio processing, four groups of uplink beam signals are shown formed in FIGS. 9 and 10 because four distinct beam code sets are used, but any number of groups can be formed as long as the number of groups formed equals the number of distinct beam code sets used in the satellite communications system. An advantage of this approach in the present invention is that all received uplink beams using the same code set must, by definition, be at least second tier with respect to other uplink beams using the same code set. Thus, by using this approach, no substantial multipath situations exists at a given destination receiver.

While the present invention has been described using an exemplary orthogonal coding scheme, the present invention can be equally applied to any satellite communications system where two adjacent beams received at the satellite are sent to the same destination receiver. Further, it will be appreciated and understood that modifications may be made without departing from the true spirit and scope of the invention.

What is claimed is:

1. A method of forming communication links in a satellite communications system, the method comprising the steps of:

receiving a plurality of uplink communications signals at a satellite, each respective uplink communications signal being transmitted from a transmitter in a plurality of transmitters in which at least one transmitter is disposed geographically near an edge of two different communications beams of a communications system; and transmitting each of the received plurality of uplink communications signals as downlink communications signal directed to a different receiver of a plurality of downlink receivers such that the same band on adjacent beams are not transmitted to the same downlink receiver.

2. The method according to claim 1, wherein the uplink communications signals are transmitted from a plurality of groups of transmitters in which at least two groups of transmitters are disposed in adjacent communications beams, each transmitter being associated with only one group of the plurality of groups, wherein each respective uplink communications signal is a code division multiple access signal having a predetermined code that is associated with the transmitter, the predetermined code being selected from a predetermined code set that is assigned to the group of transmitters sharing an uplink communications beam, each respective code set being different from other code sets associated with selected groups of transmitters so that the code sets of the selected groups of transmitters are arranged in a code set pattern, the code set pattern being repeated for each selected group of transmitters a beam group, and wherein the step of transmitting each of the received plurality of uplink communications signals in a band as a band of downlink signals includes the step of transmitting a plurality of downlink communications signals to each downlink receiver, the plurality of downlink communications signals transmitted to each downlink receiver including no more than one downlink communications signal having a predetermined code and no signals originating in the same band of adjacent uplink beams.

3. The method according to claim 2, wherein the codes of a code set are orthogonal with respect to each other.

4. The method according to claim 2, wherein the codes of a code set are non-orthogonal with respect to each other.

5. The method according to claim 2, wherein the downlink receivers are grouped in a receiver reuse pattern that is different from the code set pattern.

6. The method according to claim 2, wherein the downlink receivers are earth station receivers.

7. The method according to claim 6, wherein the code set pattern is formed by four code sets.

8. A satellite communications system comprising:

a plurality of transmitters in which at least one transmitter of the plurality is disposed geographically on an edge between two or more uplink beams, each transmitter transmitting an uplink communications signal; and a satellite receiving the uplink communications signals transmitted by groups of transmitters, the satellite transmitting each of the received uplink communications signals as a downlink communications signal directed to a different receiver of a plurality of downlink receivers, such that the same band of any two adjacent beams is not downlinked to the same band in a downlink beam.

9. The satellite communications system according to claim 8, further comprising a plurality of groups of transmitters in which at least two transmitters are disposed geographically adjacent to each other in separate transmitter groups, each transmitter being associated with only one group, wherein each respective uplink communications signal is a code division multiple access signal having a predetermined code, the predetermined code being selected from a predetermined code set that is associated with the transmitter group of the transmitters transmitting the uplink communications signal, each respective code set being different from other code sets associated with selected groups of transmitters and forming a code set pattern, the code set pattern being repeated for each selected group of transmitters, and wherein each downlink communications signal transmitted by the satellite includes no more than one downlink communications signal having the predetermined code and no signals originating in the same band of adjacent uplink beams.

10. The satellite communications system according to claim 9, wherein the downlink receivers are grouped in a receiver reuse pattern that is different from the code set pattern.

11. The satellite communications system according to claim 9, wherein the codes of a code set are orthogonal with respect to each other.

12. The satellite communications system according to claim 9, wherein the codes of a code set are non-orthogonal with respect to each other.

13. The satellite communications system according to claim 9, wherein the code set pattern is formed by four code sets.

14. The satellite communications system according to claim 9, wherein the downlink receivers are earth station receivers.

15. A method of forming communication links in a satellite communications system, comprising:

receiving a plurality of uplink communications signals at a satellite from a plurality of respective transmitters via a plurality of communications beams; and transmitting each of the received plurality of uplink communications signals as a downlink communications signal such that signals received on the same band on adjacent beams are not transmitted to a common downlink receiver.

* * * * *